Sept. 17, 1929. E. J. HALL 1,728,273
MACHINE FOR MAKING COMMUTATOR BRUSHES AND THE LIKE
Filed April 9, 1927 6 Sheets-Sheet 2

Sept. 17, 1929.  E. J. HALL  1,728,273
MACHINE FOR MAKING COMMUTATOR BRUSHES AND THE LIKE
Filed April 9, 1927  6 Sheets-Sheet 3

INVENTOR
Everett J. Hall
BY
ATTORNEY

INVENTOR
Everett J. Hall
BY
ATTORNEY

Sept. 17, 1929.  E. J. HALL  1,728,273
MACHINE FOR MAKING COMMUTATOR BRUSHES AND THE LIKE
Filed April 9, 1927   6 Sheets-Sheet 5

INVENTOR
Everett J. Hall
BY
Frank Stout
ATTORNEY

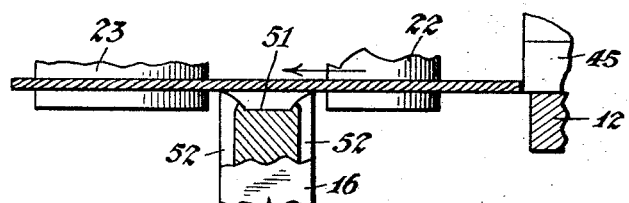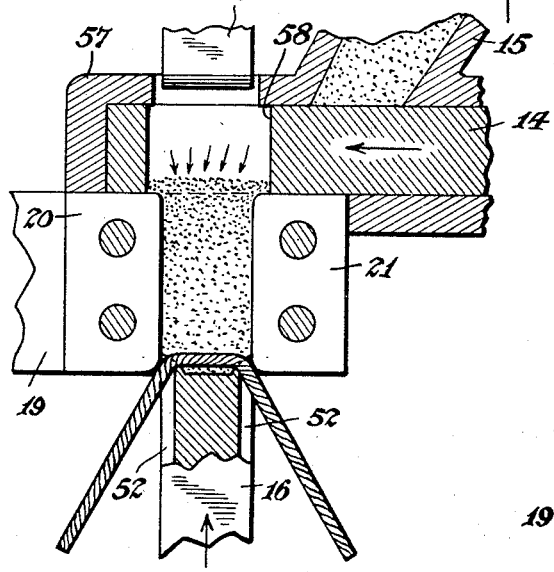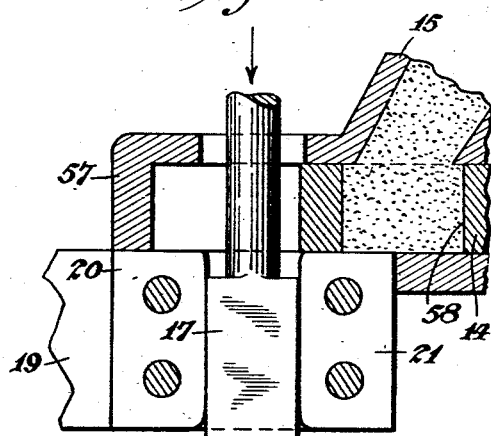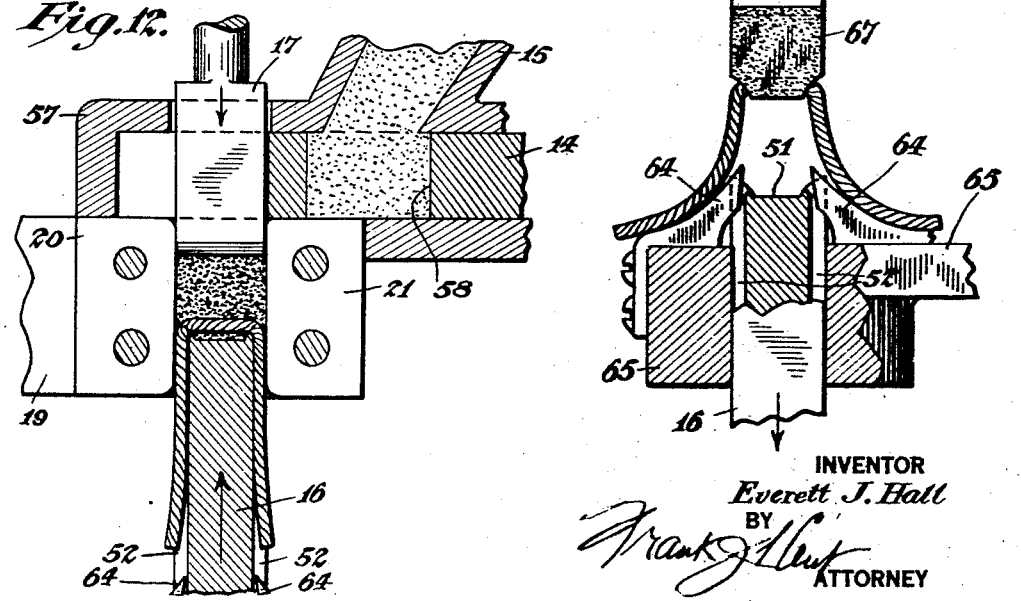

Patented Sept. 17, 1929

1,728,273

UNITED STATES PATENT OFFICE

EVERETT J. HALL, OF ELIZABETH, NEW JERSEY, ASSIGNOR TO METALS DISINTEGRATING COMPANY, INC., OF ELIZABETH, NEW JERSEY, A CORPORATION OF NEW JERSEY

MACHINE FOR MAKING COMMUTATOR BRUSHES AND THE LIKE

Application filed April 9, 1927. Serial No. 182,212.

This invention relates to a machine for making commutator brushes and the like and has for its object the provision of an automattic machine in which the powdered material which is to form the brush body is compressed directly around a length of pigtail wire.

The invention contemplates the continuous feeding of wire and powdered material into the machine, and the continuous discharge of molded brushes. The wire is cut by the machine into suitable lengths and fed to a mold, while a measured quantity of the powdered material is transferred to the mold and compressed around the intermediate portion of the length of wire. The molded brush is then discharged and the cycle of operations is repeated.

Other objects and advantages of the invention will become apparent as the description proceeds.

While I have disclosed a single embodiment of my invention for purposes of illustration, it should be understood that various changes may be made in the structure and arrangement of parts without departing from the spirit and scope of the invention as hereinafter set forth and claimed.

In the drawings:—

Figure 2:
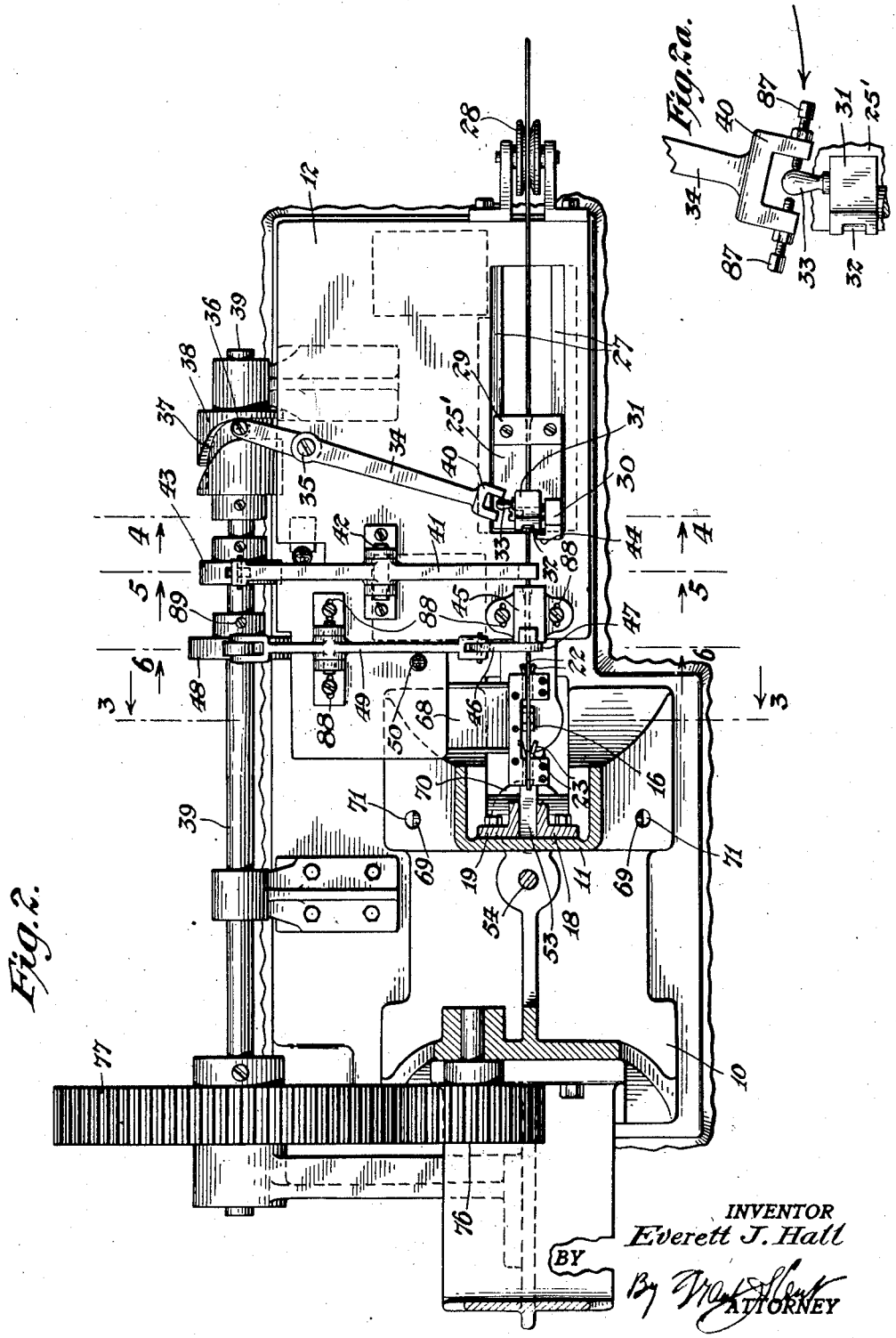
Fig. 2 is a horizontal section on the line 2—2 of Fig. 1.

Fig. 2ª is a plan of a modified detail.

Figure 1:
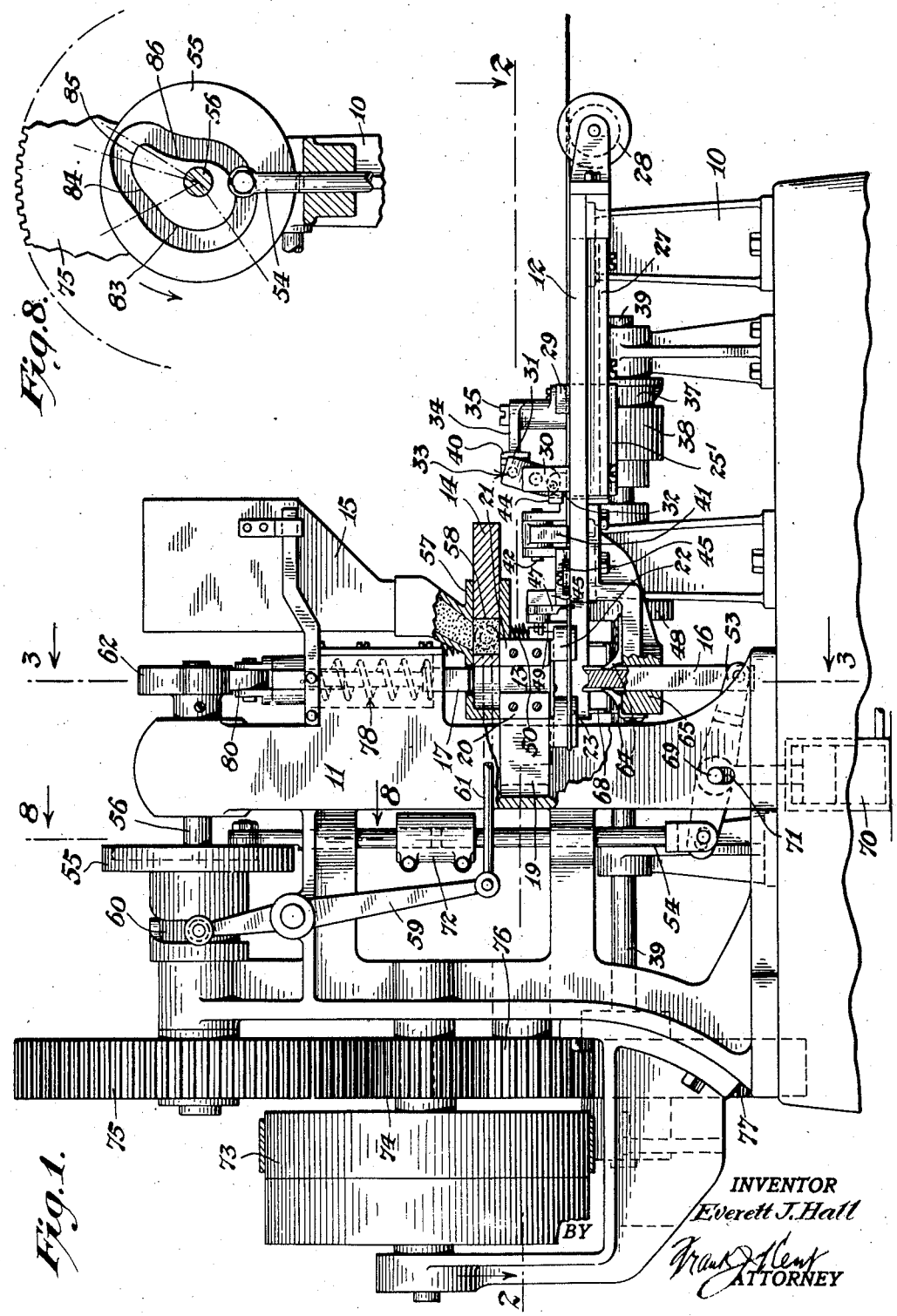
Fig. 1 is a front elevation, partly in section, of a machine embodying the invention.
Figure 3:
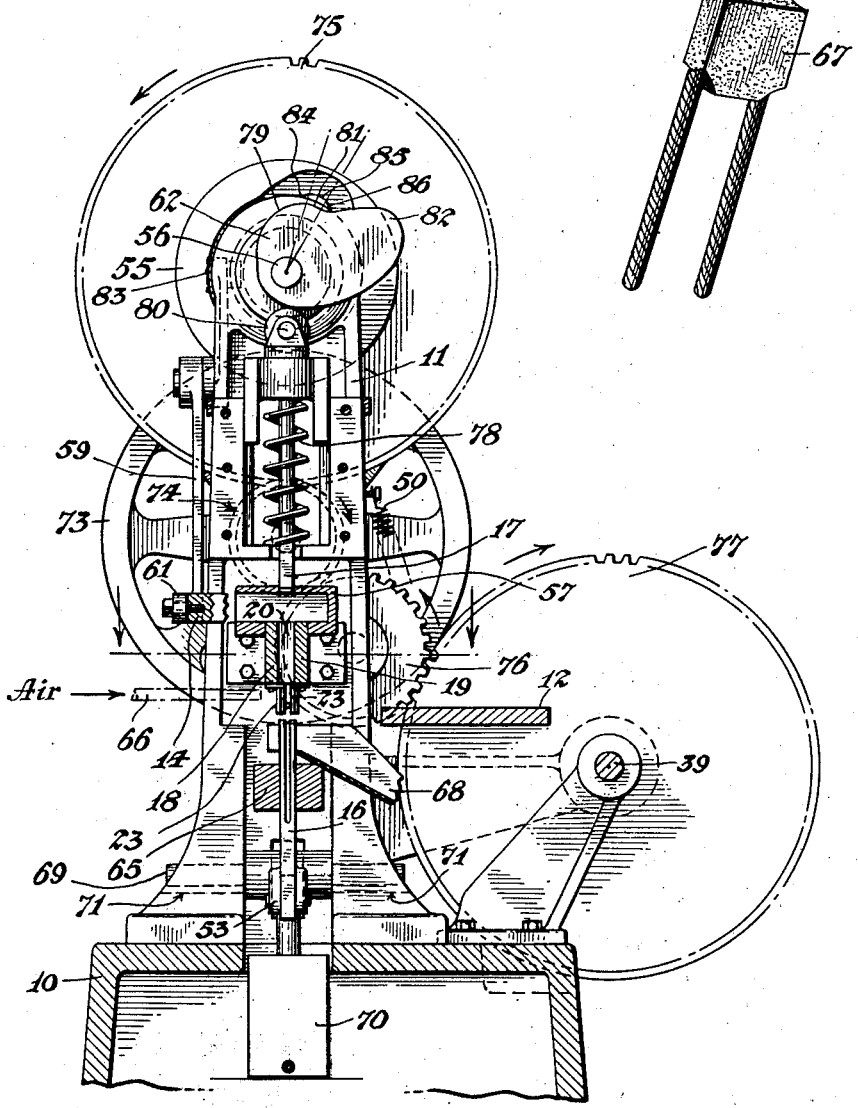
Figure 4:
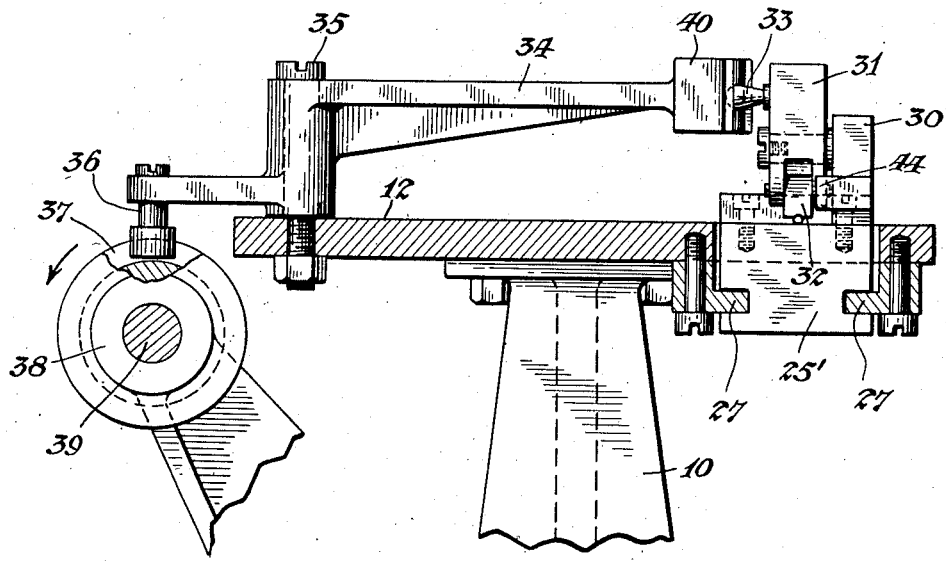
Figure 5:
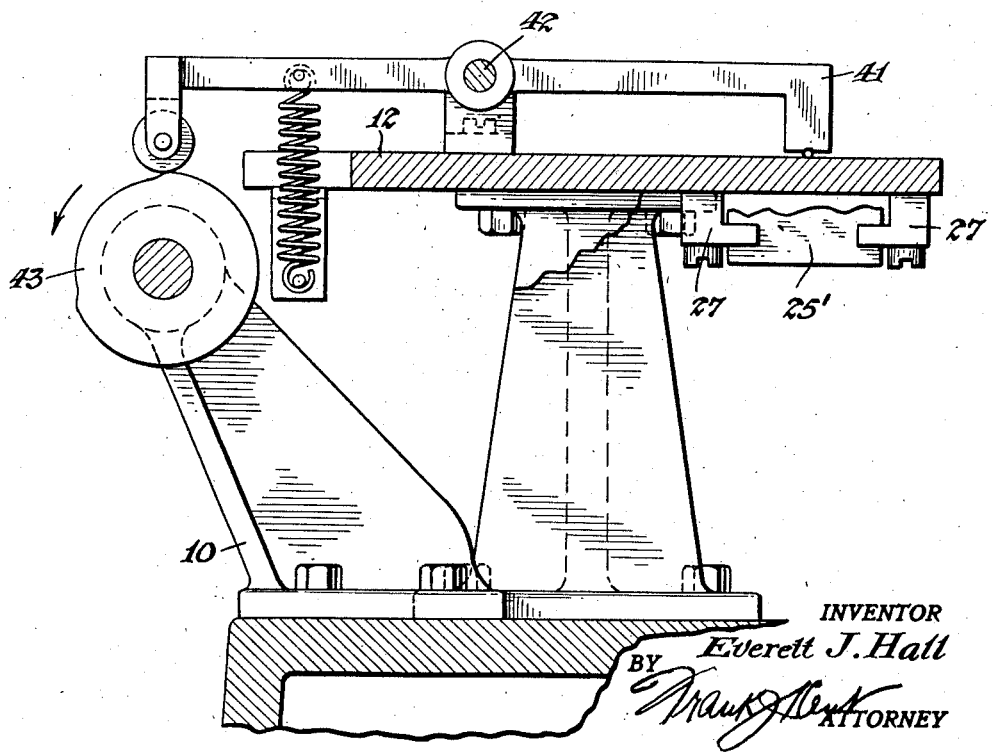
Figure 6:
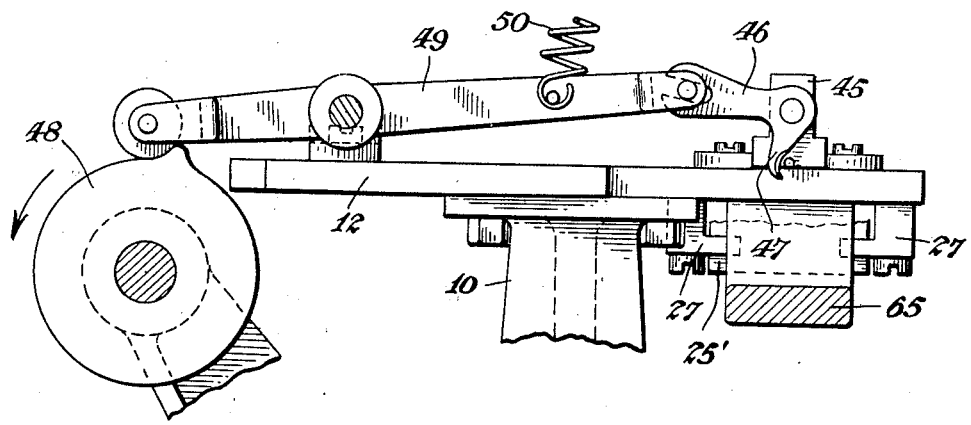
Figure 7:
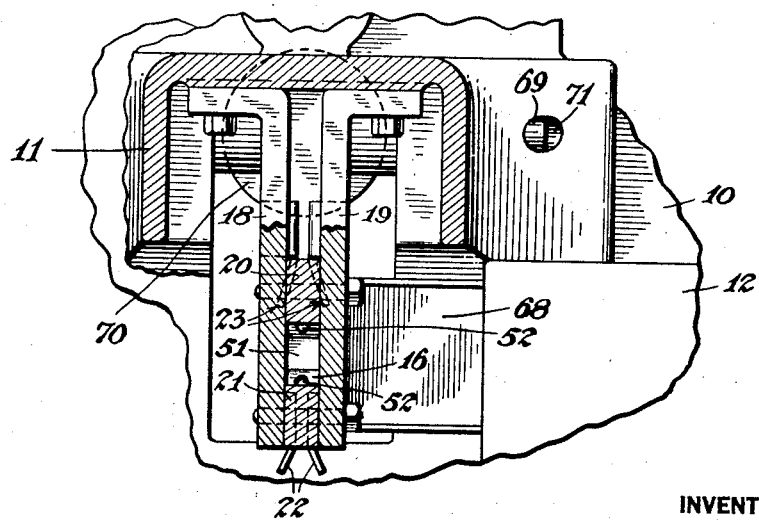

Fig. 3 is a vertical section on the line 3—3 of Figs. 1 and 2;

Fig. 4 is an enlarged vertical section on the line 4—4 of Fig. 2;

Fig. 5 is a similar view on the line 5—5 of Fig. 2;

Fig. 6 is a similar view on the line 6—6 of Fig. 2;

Fig. 7 is an enlarged detail of a portion of the machine.

Fig. 8 is a section on line 8—8 of Fig. 1.

Figure 9:
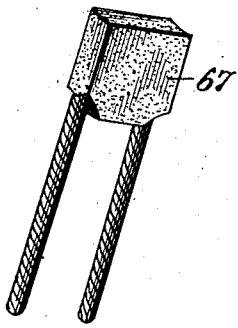

Fig. 9 is a perspective view of the product of the machine;

Figs. 10, 11, 12 and 13 are enlarged detail sectional views illustrating the several steps of the machine, namely, feeding the wire, thrusting same into the mold, feeding the powdered material into the mold, compressing same and final ejection.

Referring to the drawings more specifically, 10 represents the framework of the machine, which includes an upright post 11 and a lateral table 12. A mold 13 is positioned over the table and is fed by a slide 14 from a hopper 15 carried by post 11. The bottom of the mold is closed by a movable mold block 16, and a plunger 17 is mounted to descend into the mold to compress the material therein.

The body of the mold (Fig. 7) is composed of two heavy side members 18 and 19, between which are bolted the blocks 20 and 21 which constitute the ends of the mold. A pair of wire guides 22, having ends outwardly flaring outwardly toward the right of Fig. 1, are secured to the right-hand of side members 18 and 19. A similar set of guides 23 are secured to members 18 and 19 on the opposite side of the mold.

The wire is fed to the mold from suitable mechanism mounted on the table. In the machine illustrated the feed mechanism includes a friction ratchet mounted on a reciprocating carriage 25' (Figs. 2 and 4), which moves on rails 27 in an opening formed in the table. The wire passes over a roll 28 and then through a guide 29 mounted on one end of the carriage. On a corner of the opposite end of the carriage is mounted a post 30 to which is pivoted a lever arm 31, which carries pivotally at its lower end the presser foot 32, and has a stud 33 projecting rearwardly from its upper end. An operating arm 34 is pivoted at 35 to the rear of the table, and carries at its rear end a stud 36 engaging a cam groove 37 formed in a drum 38 rotated by counter shaft 39, and at its forward end has a yoke 40 cooperating with the stud 33.

When the carriage is at the right-hand end of its travel, the cam causes the arm 34 to move yoke 40 toward the left. This movement causes lever arm 31 to press foot 32 downwardly to clamp the wire and the carriage is then moved toward the left, carrying the wire with it. At this time the holding arm 41, which is pivoted to the table at 42, and is reciprocated by cam 43, is pressed downwardly to hold the wire in advanced position. The yoke 40 moves back to the right after an appropriate interval, and in doing so moves the lever 31 in a clockwise direction until its lower end engages a stop 44 mounted on post 30, thereby releasing the grip of foot 32 upon the wire and causing further movement of yoke 40 toward the right to carry the carriage with it until it reaches the right-hand end of its travel and is ready again to grip the wire and move it toward the left. The cams are so designed that the holding arm 41 releases its grip as soon as the friction ratchet is ready to move the wire along toward the left.

The forward movement of the ratchet mechanism has fed the wire through the cutter guide 45 and between guides 22 and 23 so that its end is now in the position illustrated in Figs. 1 and 2. In this position the arm 41 is clamping the wire against the table and the cutting mechanism is about to operate to sever from the end of the wire a length suitable for the pigtail of the commutator brush.

The cutting mechanism is fully shown in Fig. 6 and comprises a bell-crank lever 46 pivoted to the cutter guide 45 and carrying a knife blade 47. The lever 46 is operated by cam 48 through the lever arm 49, to sever the wire at the appropriate time, the knife being immediately returned to inoperative position by spring 50.

The wire length is now in position over the mold block 16, as shown in Fig. 10. The mold block has its upper end recessed as shown at 51, and has grooves 52 formed along its sides in alinement with the wire when in the position of Fig. 10.

Further operation of the machine now moves the mold block 16 upwardly into the mold until it is in the position of Fig. 11 with the ends of the wire fitting into the grooves 52. This movement of the mold block is brought about by levers 53 and 54 operated by cam 55 mounted on shaft 56.

During the next period of operation a charge of the powdered material (powdered copper or other suitable substance) is fed into the mold by movement of the slide 14. The slide fits closely in a casting 57 which communicates with the mold and with the feed hopper 15. An aperture 58, is formed through the slide, and when the slide is at the right-hand end of its travel this aperture is in register with the feed end of the hopper to thereby receive a charge of the powdered material. The slide is moved by a pivoted arm 59 which is actuated from shaft 56 by a cam groove 60 and which is connected to the slide by a rod 61. When the slide reaches the left end of its travel the aperture 58 registers with the mold opening, (Fig. 11) and part of the charge falls into the mold.

The aperture 58 is of such size and shape that it carries more material than is needed to fill the mold at its maximum capacity (Fig. 11). This is done because the powdered material varies in density and it is therefore necessary to vary the amount of material compressed in order to obtain brushes of constant size and density. The capacity of the mold is varied by adjusting the position of the mold block 16 in a manner hereinafter described. As the slide 14 retreats to the right it carries along back any surplus of material not needed to fill the mold.

At this time the plunger 17 is pressed downwardly by cam 62 on shaft 56, and just as it enters the mold the mold block 16 is moved upwardly while the plunger 17 continues moving downwardly, thus compressing the charge equally from opposite ends and insuring a product of uniform density with the wire embedded therein. The operating cams now permit a momentary dwell of the parts in order to hold the powder under the maximum pressure for an appreciable time. After the charge has been compressed to the required extent the mold block moves downwardly while plunger 17 does the same, these two parts carrying between them the molded brush and moving it downwardly clear of the mold. The downward movement of the plunger 17 ceases after it has projected below the mold to its position in Fig. 13. The mold block 16 continues to descend until it reaches its position shown in Fig. 13, the ends of the wire having been stripped from grooves 52 by a pair of strippers 64 mounted on the guide 65 through which the mold block moves. While the parts are in this position a blast of compressed air from the nozzle 66 strikes the side of the brush 67 and blows it into the discharge chute 68.

The intermediate lever 53 of the means for operating the mold block 16 is pivoted on a pin 69 mounted in the vertical post of a hydraulic support 70, which is provided in order to permit the mold block 16 to give downwardly should excessive pressure develop in the mold. The pin 69 is guided vertically by elongated slots 71 formed in the sides of the post 11. Vertical adjustment of the mold block 16 is effected by means of a sleeve 72 which permits adjustment of the length of operating rod 54, this adjustment providing for changing the capacity of the mold for a purpose explained above.

The machine can be driven in any convenient manner, as by a belt-driven pulley 73 rotating a spur gear 74 which meshes with gear 75 keyed to shaft 56, and with gear 76 which drives gear 77 keyed to shaft 39.

The parts are so arranged that the machine operates in the following sequence;

1. Wire is fed between the guide clips as the mold block rises.
2. Wire is cut as the mold block rises to a point directly beneath it.
3. Mold block thrusts wire into lower end of mold and dwells.
4. Material slide reciprocates and discharges material into the mold, returning to a position beneath the hopper.
5. Mold block continues to rise after upper plunger has descended into mold and until full compression is accomplished.
6. At the moment of full compression both mold block and plunger dwell momentarily.
7. Mold block descends followed shortly by the further descent of the plunger thereby ejecting the finished piece from the mold, the strippers in the grooves of the lower plunger spreading the pigtail to clear same from the lower plunger.
8. Air blast rocks piece rearwardly into the pan for gravity delivery. Plunger rises to initial position.

The arrangement of the cam for operating the plunger 17 will be clear from Fig. 3. A coil spring 78 surrounds the plunger and normally presses it up against the cam 62. As the cam rotates in a counter-clockwise direction the rise 79 of the cam engages roller 80 carried by the plunger and forces the plunger down to the compression position of Fig. 12. The part 81 of the cam then provides a momentary dwell for the plunger, after which the rise 82 of the cam depresses the plunger further to the ejection position of Fig. 13.

The cam which controls the mold block 16 is illustrated in Fig. 8. In this position of the cam the mold block is rising to enter the mold (Fig. 11). As the cam rotates in a counter-clockwise direction the part 83 of the cam provides dwell during which material is fed into the mold and the plunger 17 descends until it has just entered the mold. At this time the rise 84 of the cam forces the mold block upwardly to the compression position of Fig. 12, and the part 85 of the cam permits a momentary dwell of the mold block while compression takes place. The retreat 86 then moves the mold block down to the ejecting position of Fig. 13.

In certain circumstances it is advisable to alter the length of pig-tail wire attached to the brush. This can be done by providing means for adjusting the length of wire cut from the roll and fed into cooperative position with the mold. This adjusting means may comprise screws 87 mounted in the sides of yoke 40 and engaging pin 33 to permit lengthening or shortening the effective stroke of the ratchet feed mechanism. In order to insure proper centering of the wire length with relation to the mold, the slots 88, (Fig. 2) provide means for the lateral adjustment of the cutter mechanism, and the set screw 89 permits corresponding adjustment of the cam 48.

It will be seen that this invention provides an automatic machine for compressing powdered copper about the intermediate portion of a length of wire to form an improved commutator brush in an expeditious manner.

I claim:

1. An automatic machine for making commutator brushes comprising a mold, means to feed a piece of wire into proximity to the mold, a mold block movable into the mold and adapted to carry the intermediate portion of the wire into the mold, means for placing a charge of powdered material into the mold, and means for compressing the charge about the wire.

2. An automatic machine for making commutator brushes comprising a mold, means to feed a piece of wire into proximity to the mold, a mold block movable into the mold and adapted to carry the intermediate portion of the wire into the mold, means for placing a charge of powdered material into the mold, means for compressing the charge about the wire, and mechanism for discharging the molded article.

3. An automatic machine for making commutator brushes comprising a mold, friction clutch mechanism for advancing a wire into cooperative position with the mold, cutting means for severing a suitable length of the wire, means for placing a charge of powdered material into the mold, and means for compressing the charge about the wire.

4. An automatic machine for making commutator brushes comprising a mold, friction clutch mechanism for advancing a wire toward the mold, cutting means for severing a suitable length of the wire, a mold block movable into the mold and adapted to carry the intermediate portion of the wire into the mold, means for placing a charge of powdered material into the mold, and means for compressing the charge about the wire.

5. An automatic machine for making commutator brushes comprising a mold, friction clutch mechanism for advancing a wire toward the mold, cutting means for severing a suitable length of the wire, a mold block movable into the mold and adapted to carry the intermediate portion of the wire into the mold, means for placing a charge of powdered material into the mold, means for compressing the charge about the wire, and mechanism for discharging the molded article.

6. An automatic machine for making commutator brushes comprising a mold, friction clutch mechanism for advancing a wire toward the mold, holding means for gripping the wire during the return movement of the friction clutch, cutting means for severing a suitable length of the wire, a mold block movable into the mold and adapted to carry the intermediate portion of the wire into the mold, means for placing a charge of powdered material into the mold, and means for compressing the charge about the wire.

7. An automatic machine for making commutator brushes comprising a mold, friction clutch mechanism for advancing a wire toward the mold, holding means for gripping the wire during the return movement of the friction clutch cutting means for severing a suitable length of the wire, a mold block movable into the mold and adapted to carry the intermediate portion of the wire into the mold, means for placing a charge of powdered material into the mold, means for compressing the charge about the wire, and mechanism for discharging the molded article.

8. An automatic machine for making commutator brushes comprising a mold, adjustable mechanism for advancing a wire toward the mold, adjustable cutting means for severing a suitable length of the wire, means for carrying a portion of the wire length into the mold, means for placing a charge of powdered material into the mold, and means for compressing the charge about the wire.

9. An automatic machine for making commutator brushes comprising a mold, means for carrying a portion of a wire length into cooperative relation to the mold, means for feeding a charge of powdered material into the mold, and a pair of plungers movable into the mold to compress the charge about the wire, one of the plungers being operated by means permitting the plunger to give under excessive pressures.

10. An automatic machine for making commutator brushes comprising a mold, means for carrying a portion of a wire length into cooperative relation to the mold, means for feeding a charge of powdered material into the mold, a pair of plungers movable into the mold to compress the charge about the wire, and means for operating the plungers, said means being formed so as to provide for a momentary dwell of each plunger at the point of extreme compression.

11. A machine for making molded articles comprising a mold having its sides secured in spaced relation, means for feeding a piece of wire into proximity to the mold, means to feed a charge of powdered material into the mold, and means for compressing the charge about the wire.

12. A machine for making molded articles comprising a mold having its sides secured in spaced relation, a mold block movable into the mold and adapted to carry the intermediate portion of a piece of wire into the mold, means for placing a charge of powdered material into the mold, and means for compressing the charge about the wire.

13. A machine for making molded articles comprising a mold having its sides secured in spaced relation, a mold block movable into the mold and adapted to carry the intermediate portion of a piece of wire into the mold, means for placing a charge of powdered material into the mold, and a plunger adapted to be moved into the mold and acting against the mold block to compress the charge about the wire.

In testimony whereof I affix my signature.

EVERETT J. HALL.